United States Patent
Stevens et al.

(10) Patent No.: US 10,827,326 B2
(45) Date of Patent: Nov. 3, 2020

(54) USER-DEFINED VEHICLE NOTIFICATION

(71) Applicant: GM GLOBAL TECHNOLOGY OPERATIONS LLC, Detroit, MI (US)

(72) Inventors: Brandon Stevens, Detroit, MI (US); Jahid M. Hussain, Troy, MI (US); Luke J. Popiel, Rochester, MI (US); Anthony J. Sumcad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 6 days.

(21) Appl. No.: 16/167,054

(22) Filed: Oct. 22, 2018

(65) Prior Publication Data
US 2020/0128373 A1    Apr. 23, 2020

(51) Int. Cl.
*H04W 4/44* (2018.01)
*G06F 9/54* (2006.01)
*B60W 50/14* (2020.01)
*G07C 5/00* (2006.01)

(52) U.S. Cl.
CPC .............. *H04W 4/44* (2018.02); *B60W 50/14* (2013.01); *G06F 9/542* (2013.01); *G07C 5/008* (2013.01); *B60W 2050/146* (2013.01)

(58) Field of Classification Search
CPC .. H04W 4/44; B60W 50/14; B60W 2050/146; G07C 5/008; G06F 9/542
See application file for complete search history.

(56) References Cited

U.S. PATENT DOCUMENTS

| | | | | |
|---|---|---|---|---|
| 5,513,107 | A | * | 4/1996 | Gormley ............ B60G 17/0195 180/287 |
| 2005/0080606 | A1 | * | 4/2005 | Ampunan ............ G07C 5/0841 703/8 |
| 2015/0094877 | A1 | * | 4/2015 | Tahnoose ............... B60K 37/06 701/1 |
| 2015/0120083 | A1 | * | 4/2015 | Gurovich ............... G07C 5/008 701/1 |
| 2015/0121071 | A1 | * | 4/2015 | Schwarz ................. H04L 63/08 713/168 |
| 2019/0220010 | A1 | * | 7/2019 | Leonard ................ B60W 50/10 |

* cited by examiner

*Primary Examiner* — Thomas J Dailey
*Assistant Examiner* — Lam H Duong
(74) *Attorney, Agent, or Firm* — Reising Ethington P.C.; David Willoughby

(57) ABSTRACT

A system and method of executing a user-defined notification task, and wherein the method includes: receiving a user-defined notification task at the vehicle via one or more user interfaces, wherein the user-defined notification task specifies a trigger event and a notification action, the trigger event being selectable from the plurality of predefined trigger events via the one or more user interfaces, and the notification action being configurable via selection of one or more notification settings via the plurality of notification settings; in response to receiving the user-defined notification task at the vehicle, configuring one or more vehicle system modules to monitor for an occurrence of the trigger condition of the user-defined notification event; and in response to detecting the occurrence of the trigger event of the user-defined notification task, executing the notification action so that a vehicle user is notified of the occurrence of the trigger event.

16 Claims, 4 Drawing Sheets

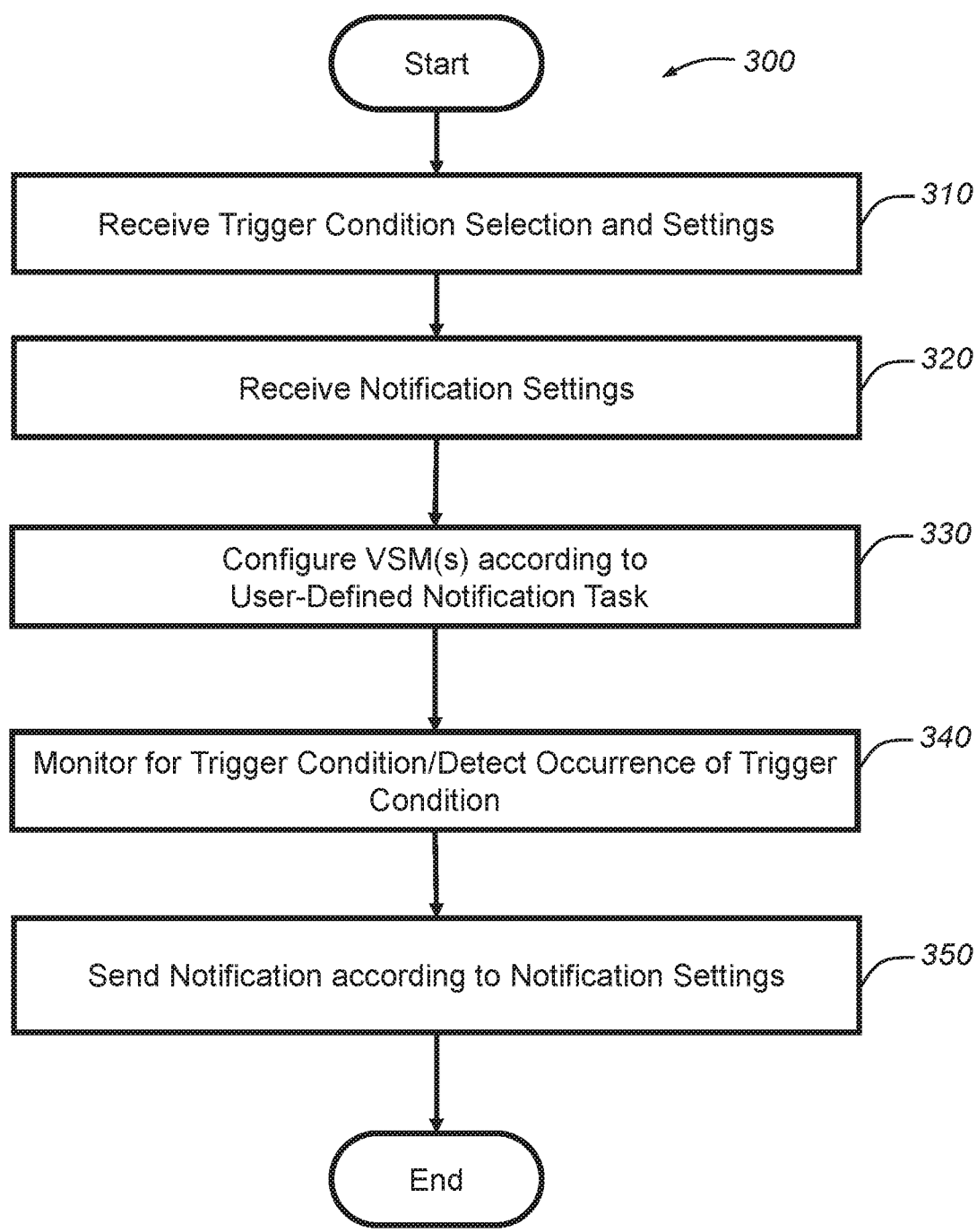

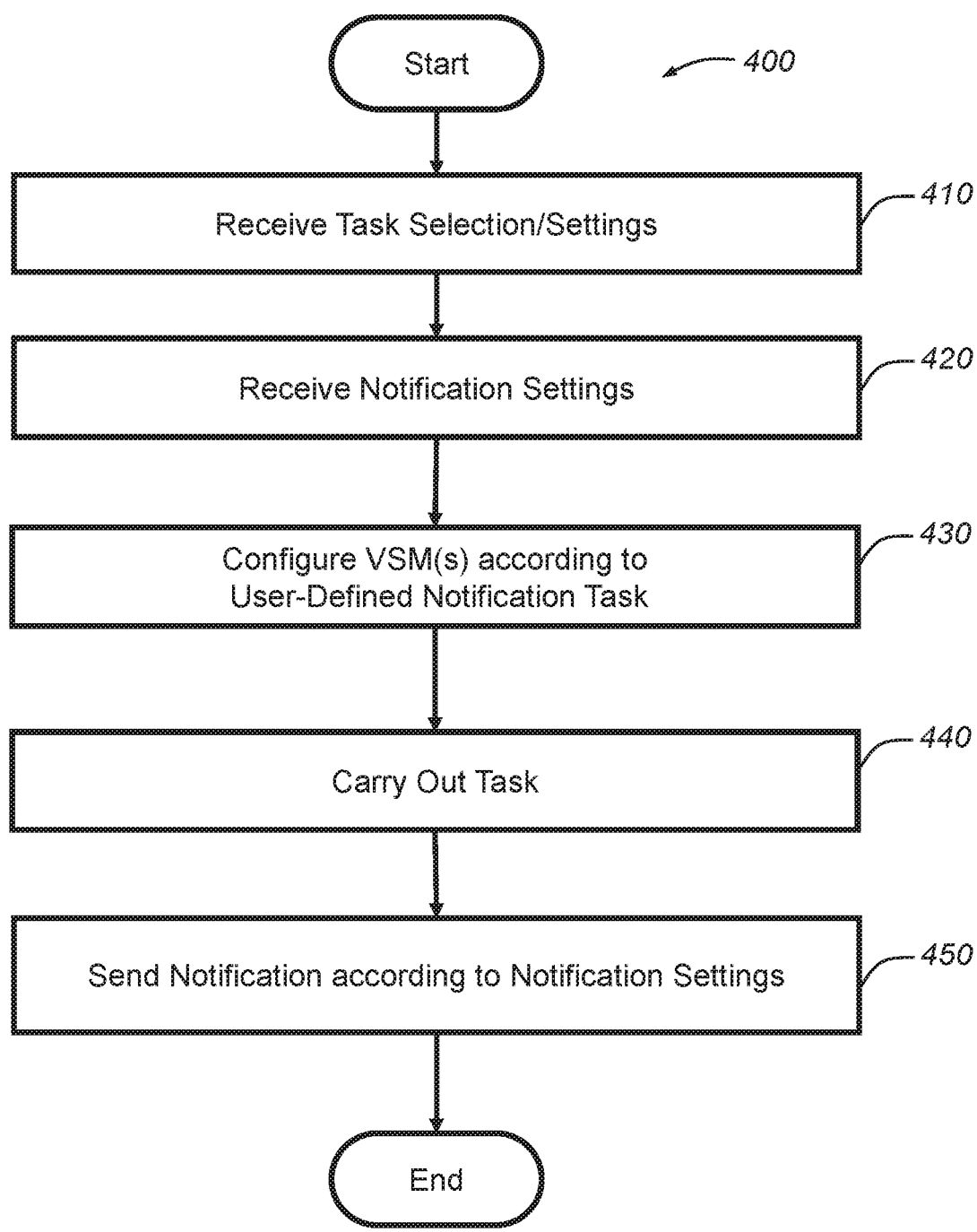

USER-DEFINED VEHICLE NOTIFICATION

INTRODUCTION

The present invention relates to user-defined notifications concerning a vehicle.

Vehicles include hardware and software capable of obtaining and processing various information, including information that is obtained by vehicle system modules (VSMs). Moreover, vehicles include networking capabilities and can be connected to a vehicle backend server that maintains accounts for users and their vehicles. Users may also provide input to the vehicle via one or more vehicle user interfaces.

SUMMARY

According to one aspect of the invention, there is provided a method of executing a user-defined notification task, wherein the method is carried out by vehicle electronics of the vehicle, wherein the vehicle includes memory that stores a plurality of predefined trigger events and notification settings, and wherein the method includes: receiving a user-defined notification task at the vehicle via one or more user interfaces, wherein the user-defined notification task specifies a trigger event and a notification action, the trigger event being selectable from the plurality of predefined trigger events via the one or more user interfaces, and the notification action being configurable via selection of one or more notification settings via the plurality of notification settings; in response to receiving the user-defined notification task at the vehicle, configuring one or more vehicle system modules (VSMs) to monitor for an occurrence of the trigger condition of the user-defined notification event; and in response to detecting the occurrence of the trigger event of the user-defined notification task, executing the notification action so that a vehicle user is notified of the occurrence of the trigger event.

According to various embodiments, this method may further include any one of the following features or any technically-feasible combination of some or all of these features:
  wherein the one or more user interfaces are one or more vehicle-user interfaces that includes a touch-screen display, and wherein the touch-screen display is installed on the vehicle and is a part of the vehicle electronics;
  the receiving step includes receiving trigger event parameters via the one or more user interfaces and a selection of a predefined trigger event type;
  the configuring step includes identifying the one or more VSMs to be configured based on the predefined trigger event type;
  the configuring step further includes sending the trigger parameters to the identified VSM(s);
  the configuring step further includes generating trigger event code that, when executed by the identified VSM(s), causes the identified VSM(s) to monitor for an occurrence of the trigger event;
  the configuring step further includes carrying out the generating step at a first VSM and then sending the trigger event code to the identified VSM(s);
  the configuring step further includes monitoring for an occurrence of the trigger event by executing the trigger event code at the identified VSM(s);
  the notification action includes generating a notification message according to the selected notification settings and sending the notification message to a device that is not a part of the vehicle electronics or a part of a backend vehicle facility; and/or
  the notification action includes directly sending the notification message to the device without sending the notification message to a backend vehicle facility.

According to another aspect of the invention, there is provided a method of executing a user-defined notification task, wherein the method is carried out by vehicle electronics of the vehicle, wherein the vehicle includes memory that stores a plurality of predefined vehicle logging tasks and notification settings, and wherein the method includes: receiving a user-defined notification task at the vehicle via one or more vehicle-user interfaces of the vehicle, wherein the user-defined notification task specifies a vehicle logging task and a notification action, the vehicle logging task being selectable from the plurality of predefined vehicle logging tasks via the one or more vehicle-user interfaces, and the notification action being configurable via selection of one or more notification settings via the plurality of notification settings; in response to receiving the user-defined notification task at the vehicle, carrying out the vehicle logging task of the user-defined notification event, wherein the vehicle logging task includes collecting information concerning the operation of the vehicle; and in response to detecting an occurrence of a trigger condition of the user-defined notification task, executing the notification action so that a vehicle user is provided the reporting information.

According to various embodiments, this method may further include any one of the following features or any technically-feasible combination of some or all of these features:
  the trigger condition is a reporting task frequency that is specified as a part of the user-defined notification task;
  each of the plurality of vehicle logging tasks specify a particular type of information to be collected as a part of carrying out the vehicle logging task;
  the collected information of the vehicle is information collected concerning a vehicle operational state;
  the carrying out step includes inspecting a vehicle log that is regularly maintained by the vehicle and extracting information from the vehicle log in accordance with the vehicle logging task;
  the carrying out step further includes storing the extracted information in a separate file for the user-defined notification task;
  the notification action includes generating a notification message according to the selected notification settings and sending the notification message to a device that is not a part of the vehicle electronics or a part of a backend vehicle facility;
  the notification action includes directly sending the notification message to the device without sending the notification message to a backend vehicle facility;
  the carrying out step is performed by a first VSM of the vehicle electronics and the executing step is carried out by a second VSM of the vehicle electronics that is separate from the first VSM; and/or
  the vehicle periodically updates a list of the plurality of predefined vehicle logging tasks, and wherein the list is stored on the memory of the vehicle electronics.

BRIEF DESCRIPTION OF THE DRAWINGS

One or more embodiments of the invention will hereinafter be described in conjunction with the appended drawings, wherein like designations denote like elements, and wherein:

FIG. 3 is a flowchart of an embodiment of a method of executing a user-defined notification task; and FIG. 4 is a flowchart of another embodiment of a method of executing a user-defined notification task.

DETAILED DESCRIPTION

Figure 1:
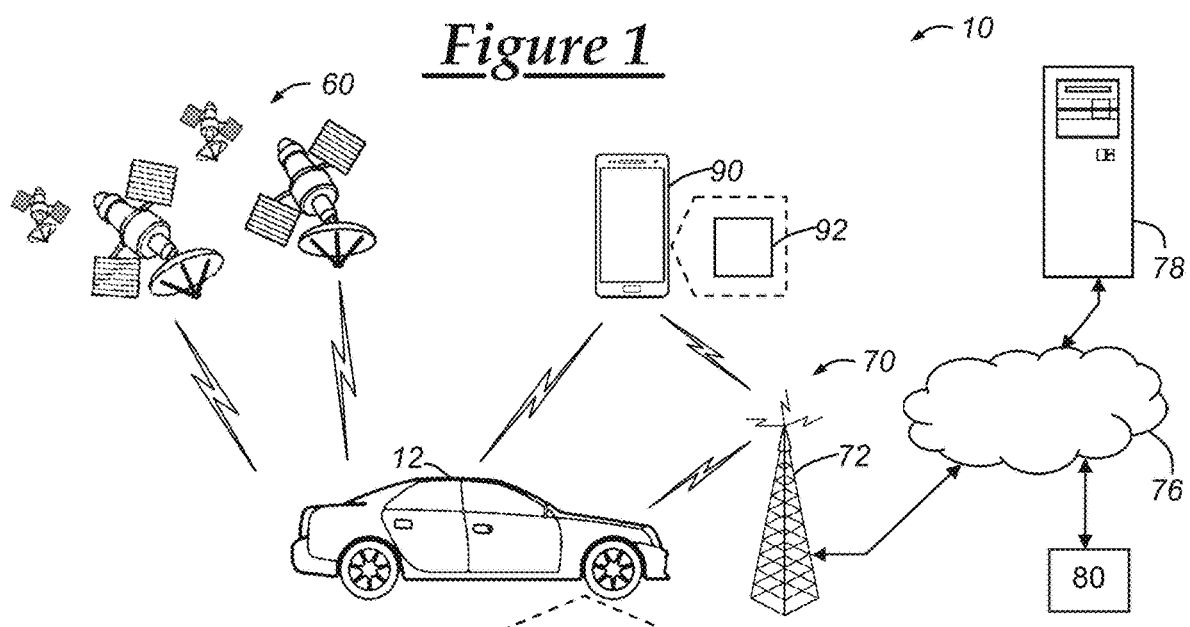
FIG. 1 is a block diagram depicting an embodiment of a communications system that is capable of utilizing the method disclosed herein.
Figure 1:
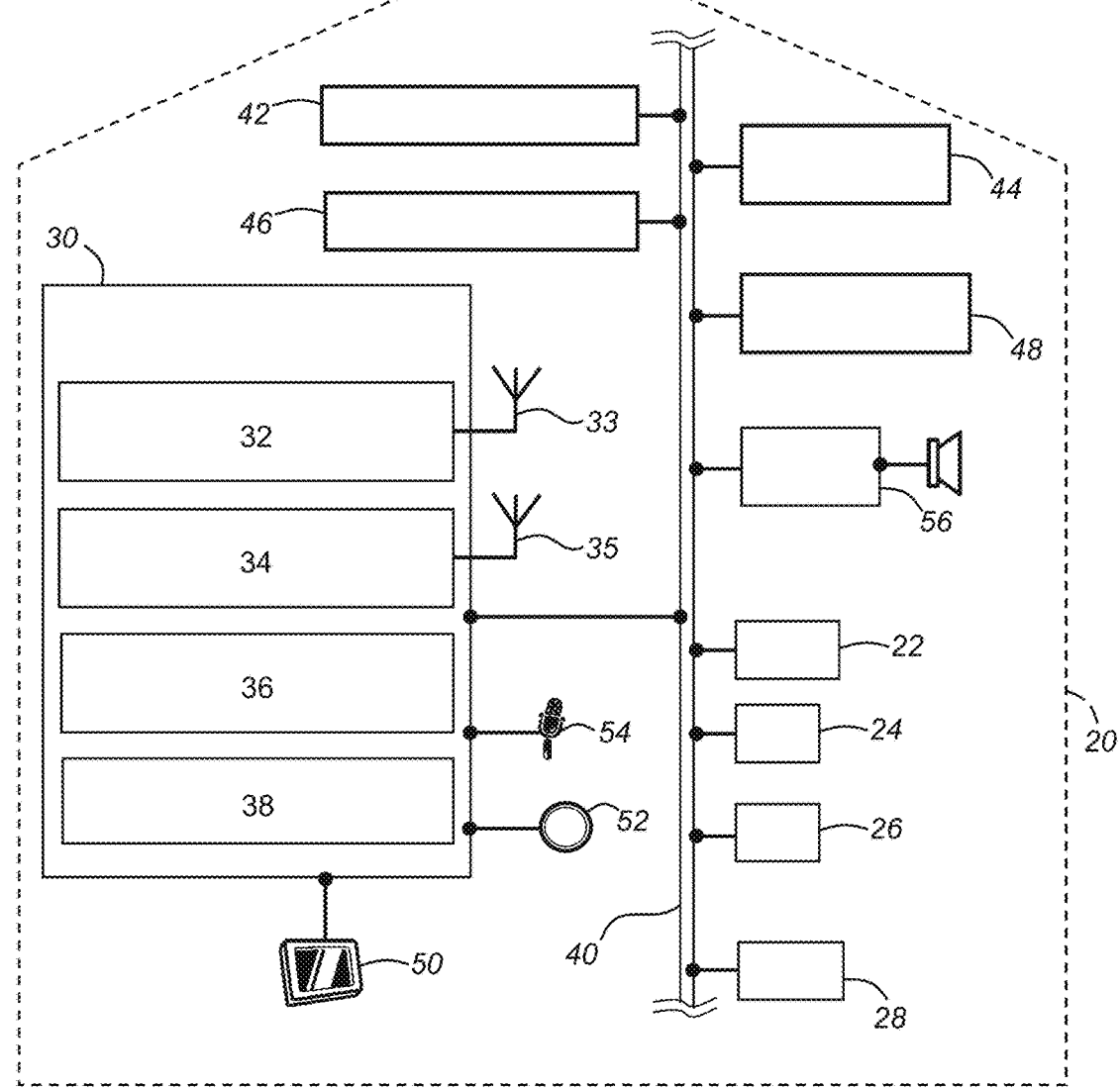

The system and method described below enables a vehicle to be configured in accordance with a user-defined notification task such that a vehicle user is notified upon the occurrence of a trigger event. In one embodiment, memory of the vehicle electronics stores a plurality of predefined trigger events and notification settings. A predefined trigger event can specify one or more conditions that are monitored for by the vehicle, and can be stored in memory of the vehicle electronics prior to carrying out the method. For example, a predefined trigger event can correspond to a vehicle ignition state, such as a vehicle ignition ON state, or may correspond to a battery state of charge (SoC) being below a particular battery SoC threshold. The notification settings can specify a notification device that can be notified when an occurrence of the trigger event is detected.

The predefined trigger event can be selectable from a plurality of predefined trigger types (or templates), such as a location trigger, an ignition state trigger, a diagnostic trigger, and an emergency trigger. In some embodiments, the selected trigger type can be configurable based on trigger parameters that allow customization of the selected trigger type. For example, a vehicle user can select a location trigger and, then, can specify a particular location (e.g., an address, boundaries, geographical coordinates) to be associated (or used with) the location trigger. The vehicle can then configure one or more VSMs to monitor for an occurrence of the trigger event, which can include detecting when the vehicle arrives at the specified location. Then, upon the detection of the occurrence of the trigger event, a notification can be sent to the notification device, which can be a handheld wireless device (e.g., smartphone), for example.

In addition to specifying a trigger event, the vehicle user can also specify notification settings that can dictate how the notification is carried out once the occurrence of the trigger event is detected. The notification settings can include a notification device, a notification time (including, in some instances, a notification frequency), a notification type (e.g., Short Message Service (SMS), email, HWD application notification), and a notification message body. In some embodiments, the notification message body can be automatically generated by the vehicle based on the trigger event—however, in at least one embodiment, the notification message body can be customizable, but may include an automatically-generated message as a default and/or starting point prior to customization. In continuing with the location trigger example above, the vehicle user can also specify notification settings that dictate how the notification is carried out when it is detected that the vehicle arrives at the specified location. For example, the vehicle user can select a notification type of SMS, select notification devices of a first HWD and a second HWD, and select a notification time of "immediately," which means that the notification will be sent upon detection of an occurrence of the trigger event. Thus, when it is detected that the vehicle arrives at the specified location, the first HWD and the second HWD will be notified via a SMS message. The SMS message can include the notification message body that indicates that the vehicle has arrived at the specified location. In addition to the notification message body, other information can be included with the notification message, such as a time of detecting the occurrence of the trigger event (or "trigger time"), vehicle state information (e.g., a location of the vehicle at the time of detecting the occurrence of the trigger event (or "trigger location")), a vehicle operator (or other users) at the vehicle at the time of detecting the occurrence of the trigger event ("trigger user(s)"), and a vehicle identifier (e.g., a nickname for the vehicle specified by a vehicle user, VIN, other information identifying the vehicle).

With reference to FIG. 1, there is shown an operating environment that comprises a communications system 10 and that can be used to implement the method disclosed herein. Communications system 10 generally includes a vehicle 12, a constellation of global navigation satellite system (GNSS) satellites 60, one or more wireless carrier systems 70, a land communications network 76, a computer or server 78, and a vehicle backend services facility 80. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally in FIG. 1 and includes a global navigation satellite system (GNSS) receiver 22, a body control module or unit (BCM) 24, an engine control module (ECM) 26, other vehicle system modules (VSMs) 28, a wireless communications device 30, sensors 42-48, display 50, and other vehicle-user interfaces 52-56. Some or all of the different vehicle electronics may be connected for communication with each other via one or more communication busses, such as communications bus 40. The communications bus 40 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

The vehicle 12 can include numerous vehicle system modules (VSMs) as part of vehicle electronics 20, such as the GNSS receiver 22, BCM 24, ECM 26, wireless communications device 30, sensors 42-48, display 50, and other vehicle-user interfaces 52-56, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 can be connected by communications bus 40 to the other VSMs, as well as to the wireless communications device 30, and can be programmed to run vehicle system and subsystem diagnostic tests. Moreover, each of the VSMs can include and/or be communicatively coupled to suitable hardware that enables intra-vehicle communications to be carried out over the communications bus 40; such hardware can include, for example, bus interface connectors and/or modems. One or more VSMs 28 may periodically or occasionally have their software or firmware updated and, in some embodiments, such vehicle updates may be over the air (OTA) updates that are received from a computer 78 or remote facility 80 via land network 76 and communications device 30. In one embodiment, OTA updates can be sent from a remote server (e.g., vehicle backend services facility 80) to the vehicle 12 that includes updated (or new) predefined trigger events, notification settings, or other updated information that can be used for or as a part of carrying out the method discussed below. As is appreciated by those skilled in the art, the above-mentioned VSMs are only examples of some of the modules that may be used in vehicle 12, as numerous others are also possible.

Global navigation satellite system (GNSS) receiver 22 receives GNSS signals from a constellation of GNSS satellites 60. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 60. And, in another example, GNSS receiver 22 can be a BDS receiver that receives a plurality of GNSS (or BDS) signals from a constellation of GNSS (or BDS) satellites 60. In either implementation, GNSS receiver 22 can include at least one processor and memory, including a non-transitory computer readable memory storing instructions (software) that are accessible by the processor for carrying out the processing performed by the receiver 22.

The GNSS receiver 22 may be used to provide navigation and other position-related services to the vehicle operator. Navigation information can be presented on the display 50 (or other display within the vehicle) or can be presented verbally such as is done when supplying turn-by-turn navigation. The navigation services can be provided using a dedicated in-vehicle navigation module (which can be part of GNSS receiver 22 and/or incorporated as a part of wireless communications device 30 or other VSM), or some or all navigation services can be done via the wireless communications device (or other telematics-enabled device) installed in the vehicle, wherein the position information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in a car sharing service. Also, new or updated map data can be downloaded to the GNSS receiver 22 from the remote facility 80 via the wireless communications device 30. A vehicle user may select a menu option using the display 50 (or other vehicle-user interface) that causes the display 50 to present navigation information, such as maps of the user's present location and/or route. In some embodiments, the GNSS receiver 22 may be integrated with or part of a center stack module (CSM) and/or integrated with the wireless communications device 30. Or, the GNSS receiver 22 may be a separate device that is connected to other VSMs via bus 40, as depicted in FIG. 1.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 40. In some embodiments, the BCM 24 may be integrated with or part of a center stack module (CSM) and/or integrated with wireless communications device 30. Or, the BCM may be a separate device that is connected to other VSMs via bus 40. The BCM 24 can include a processor and/or memory, which can be similar to processor 36 and memory 38 of wireless communications device 30, as discussed below. The BCM 24 may communicate with wireless device 30 and/or one or more vehicle system modules, such as the engine control module (ECM) 26, battery sensor(s) 42, movement sensor(s) 44, vision sensor(s) 46, exhaust sensor(s) 48, audio system 56, or other VSMs 28. The BCM 24 may include a processor and memory accessible by the processor. Suitable memory may include non-transitory computer-readable memory that includes various forms of RAM and ROM. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. For example, the BCM 24 can send signals to other VSMs, such as a request to perform a particular operation or a request for vehicle sensor data and, in response, the sensor may then send back the requested information. And, the BCM 24 may receive vehicle sensor data from VSMs, including battery sensor data or other sensor data from battery sensor(s) 42, movement sensor data from movement sensor 44, spatial or image data from vision sensor(s) 46, exhaust sensor data or other sensor data from exhaust sensor(s) 48, and various other information or data from other VSMs.

Additionally, the BCM 24 may provide vehicle state information corresponding to the vehicle state or of certain vehicle components or systems, including the VSMs discussed herein. For example, the BCM 24 may provide the device 30 with information indicating whether the vehicle's ignition is turned on (as received from ECM 26, for example), the gear the vehicle is presently in (i.e. gear state), and/or other information regarding the vehicle. The vehicle sensor data and/or vehicle operating state information that is received or obtained at the BCM 24 can be used to monitor certain vehicle operations and, in some embodiments, the BCM 24 can be configured to monitor for certain vehicle conditions as specified in the vehicle-specific sensor configuration request that is received from the remote facility 80. This monitoring may be carried out as part of a vehicle monitoring process or diagnostic process, which can be configured pursuant to user-defined notification tasks. The information collected by the BCM 24 can be sent to the wireless communications device 30 (or other central vehicle computer) automatically upon a request from the device/computer, or automatically upon certain conditions being met, such as when the BCM recognizes the occurrence of a trigger event. The wireless communications device 30 can then send the vehicle sensor data (and/or other information) to the remote facility 80 via cellular carrier system 70 and/or land network 76. As used herein, a "powered on state" (or an "ignition ON state") is a state of the vehicle in which the ignition or primary propulsion system of the vehicle is powered on and, as used herein, a "powered off state" (or an "ignition OFF state") is a state of the vehicle in which the ignition or primary propulsion system of the vehicle is not powered on. Moreover, the powered on state can include instances in which the accessory electronics of the vehicle is supplied with electrical power (e.g., the key of the vehicle is in an accessory (ACC) position).

Engine control module (ECM) 26 controls various aspects of engine operation, such as fuel ignition and ignition timing. The ECM 26 is connected to the communications bus 40 and may receive operation instructions (or vehicle commands) from the BCM 24 or other vehicle system modules, such as the wireless communications device 30 or other VSMs 28. In one scenario, the ECM 26 may receive a command from the BCM to start the vehicle—i.e., initiate the vehicle ignition or other primary propulsion system (e.g., a battery powered motor). Moreover, the ECM 26 is an onboard vehicle sensor that can be used to obtain vehicle sensor information of the vehicle engine, such as from an engine speed sensor, an engine temperature sensor, and an engine ignition timing sensor, all of which are also onboard vehicle sensors. In embodiments when the vehicle is a hybrid or electric vehicle, the ECM 26 can be used to obtain status information regarding the primary mover (including electrical motor(s) and battery information).

The vehicle 12 includes various onboard vehicle sensors, as well as certain vehicle-user interfaces that can be utilized as onboard vehicle sensors. Generally, the sensors can obtain vehicle sensor data, which can include vehicle sensor values as measured or determined by the onboard vehicle sensor. Also, the ECM 26 can include various sensors, such as engine speed sensor, an engine temperature sensor, and an engine ignition timing sensor. Other information pertaining to either the operating state of the vehicle (the "vehicle operating state") or the environment of the vehicle (the "vehicle environmental state") can also be obtained or may be included in the vehicle sensor data. The vehicle sensor data can be sent to other VSMs, such as BCM 24 and the wireless communications device 30, via communications bus 40. Also, in some embodiments, the vehicle sensor data can be sent with metadata, which can include data identifying the sensor (or type of sensor) that captured the vehicle sensor data, a timestamp (or other time indicator), and/or other data that pertains to the vehicle sensor data or vehicle sensor. The "vehicle operating state" refers to a state of the vehicle concerning the operation of the vehicle, which can include the operation of the primary mover (e.g., a vehicle engine, vehicle propulsion motors). Additionally, the vehicle operating state can include the vehicle state concerning mechanical or electronic operations of the vehicle. The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle.

The battery sensor(s) 42, which can be installed into the vehicle as an onboard vehicle sensor, can include a battery voltage sensor, a battery current sensor, and a battery temperature sensor. The battery voltage sensor can be used to measure the voltage across terminals of a vehicle battery. The battery current sensor can be used to measure current provided by the vehicle battery, and the battery temperature sensor can be used to measure a temperature of the vehicle battery. In one particular embodiment, the battery voltage sensor, the battery current sensor, and the battery temperature sensor can be included in and/or integrated into a single module or sensor unit that is coupled to the battery. The battery sensor(s) 42 can be coupled to various other VSMs directly or via communications bus 40.

The movement sensors 44 can be used to obtain movement or inertial information concerning the vehicle, such as vehicle speed, acceleration, yaw (and yaw rate), pitch, roll, and various other attributes of the vehicle concerning its movement as measured locally through use of onboard vehicle sensors. The movement sensors 44 can be mounted on the vehicle in a variety of locations, such as within an interior vehicle cabin, on a front or back bumper of the vehicle, and/or on the hood of the vehicle 12. The movement sensors 44 can be coupled to various other VSMs directly or via the communications bus 40. Movement sensor data can be obtained and sent to the other VSMs, including BCM 24 and/or wireless communications device 30.

In one embodiment, the movement sensors 44 can include wheel speed sensors, which can be installed into the vehicle as an onboard vehicle sensor. The wheel speed sensors are each coupled to a wheel of the vehicle 12 and that can determine a rotational speed of the respective wheel. The rotational speeds from various wheel speed sensors can then be used to obtain a linear or transverse vehicle speed. Additionally, in some embodiments, the wheel speed sensors can be used to determine acceleration of the vehicle. The wheel speed sensors can include a tachometer that is coupled to a vehicle wheel and/or other rotating member. In some embodiments, wheel speed sensors can be referred to as vehicle speed sensors (VSS) and can be a part of an anti-lock braking (ABS) system of the vehicle 12 and/or an electronic stability control program. As discussed more below, the electronic stability control program can be embodied in a computer program or application that can be stored on a non-transitory, computer-readable memory (such as that which is included in BCM 24 or memory 38). The electronic stability control program can be executed using a processor of BCM 24 (or processor 36 of the wireless communications device 30) and can use various sensor readings or data from a variety of vehicle sensors including sensor data from sensors 42-54.

Additionally, the movement sensors 44 can include one or more inertial sensors, which can be installed into the vehicle as an onboard vehicle sensor. The inertial sensor(s) can be used to obtain sensor information concerning the acceleration and the direction of the acceleration of the vehicle. The inertial sensors can be microelectromechanical systems (MEMS) sensor or accelerometer that obtains inertial information. The inertial sensors can be used to detect collisions based on a detection of a relatively high acceleration. When a collision is detected, information from the inertial sensors used to detect the collision, as well as other information obtained by the inertial sensors, can be sent to the wireless communication module 30 (or other central vehicle computer of the vehicle) and used in determining the quality of care. Additionally, the inertial sensor can be used to detect a high level of acceleration or braking. In one embodiment, the vehicle 12 can include a plurality of inertial sensors located throughout the vehicle. And, in some embodiments, each of the inertial sensors can be a multi-axis accelerometer that can measure acceleration or inertial force along a plurality of axes. The plurality of axes may each be orthogonal or perpendicular to one another and, additionally, one of the axes may run in the direction from the front to the back of the vehicle 12. Other embodiments may employ single-axis accelerometers or a combination of single- and multi-axis accelerometers. Other types of sensors can be used, including other accelerometers, gyroscope sensors, and/or other inertial sensors that are known or that may become known in the art.

The movement sensors 44 can include one or more yaw rate sensors, which can be installed into the vehicle as an onboard vehicle sensor. The yaw rate sensor(s) can obtain vehicle angular velocity information with respect to a vertical axis of the vehicle. The yaw rate sensors can include gyroscopic mechanisms that can determine the yaw rate and/or the slip angle. Various types of yaw rate sensors can be used, including micromechanical yaw rate sensors and piezoelectric yaw rate sensors.

The movement sensors 44 can also include a steering wheel angle sensor, which can be installed into the vehicle as an onboard vehicle sensor. The steering wheel angle sensor is coupled to a steering wheel of vehicle 12 or a component of the steering wheel, including any of those that are a part of the steering column. The steering wheel angle sensor can detect the angle that a steering wheel is rotated, which can correspond to the angle of one or more vehicle wheels with respect to a longitudinal axis of vehicle 12 that runs from the back to the front. Sensor data and/or readings from the steering wheel angle sensor can be used in the electronic stability control program that can be executed on a processor of BCM 24 or processor 36.

And, additionally, the movement sensors 44 can include a throttle position sensor (TPS), which can be installed into the vehicle as an onboard vehicle sensor. The TPS that can be used to determine a position of a throttle device of vehicle 12. For example, the throttle position sensor can be coupled to an electronic throttle body or system that is controlled by an actuator (such as a gas pedal) via a throttle actuation controller. The TPS can measure throttle position in a variety of ways, including through using a pin that rotates according to the throttle position (e.g., the output of the throttle actuation controller) and that reads a voltage through the pin. The voltage through the pin can vary due to the pin's position, which varies the amount of resistance of the circuit and the voltage. This voltage data (or other data derived therefrom) can be sent to BCM 24, which can use such vehicle sensor data as a part of the electronic stability control program, as well as various other programs or applications. The movement sensors 44 can include various other sensors not explicitly mentioned here, including brake pedal position sensors and other sensors contributing to a change in movement (i.e., a change in direction or propulsion, as indicated by a sensor reading of a vehicle operation or as indicated by receiving an input that (typically) results in a change in direction or propulsion).

Vision sensor(s) 46 are each an onboard vehicle sensor and may be any type of sensor that obtains visual or spatial information concerning an area within or surrounding the vehicle 12. For example, the vision sensor(s) 46 can be cameras, radars, lidars, etc. The data obtained by the vision sensor(s) 46 may be sent to another vehicle system module (VSM) such as wireless communications device 30 and/or BCM 24 via communications bus 40. In one embodiment, the vision sensor(s) 46 include an electronic digital camera that is powered through use of a vehicle battery. The electronic digital camera may include a memory device and a processing device to store and/or process data that it captures or otherwise obtains, and can be any suitable camera type (e.g., charge coupled device (CCD), complementary metal oxide semiconductor (CMOS), etc.) with any suitable lens.

The vision sensor(s) 46 can be used to capture photographs, videos, and/or other information pertaining to light, which is collectively referred to herein as vision data and which is a particular type of vehicle sensor data. In one embodiment, the vision data can be image data, which is vision data that can be represented in a pixel array and can be captured using interlacing or progressive scanning techniques, as well as other similar or suitable techniques. The image data can be captured at a set or pre-configured scanning or sampling frequency, and the vision sensor(s) may be configured to obtain image data of a particular resolution. Once the image data is obtained through using the vision sensor(s) 46, the image data (or other vision data) can be processed and then sent to one or more other VSMs, including the wireless communications devices 30 and/or the BCM 24. The vision sensor(s) 46 can include processing capabilities that enable image processing techniques, including object recognition techniques, to be carried out at the vision sensor(s) 46. Or, in other embodiments, the cameras may send raw or formatted image data to another VSM, such as device 30 (or other central vehicle computer), which can then perform the image processing techniques.

The exhaust sensor(s) 48 is an onboard vehicle sensor and may be comprise of various sensors that are used to detect or measure characteristics of exhaust gas generated by the vehicle engine. For example, the exhaust sensor(s) 48 can include at least one oxygen sensor (or lambda sensor) that measures the proportional amount of oxygen in the exhaust. Various other gas detectors or gas ionization detectors can be used to measure the content of other elements or molecules, as well as other properties of the exhaust gas. The exhaust sensor data can be sent to one or more other vehicle modules via communications bus 40.

Additionally, the vehicle 12 can include other sensors not explicitly mentioned above, including parking sensors, lane change and/or blind spot sensors, lane assist sensors, ranging sensors (i.e., sensors used to detect the range between the vehicle and another object, such as through use of radar or lidar), tire-pressure sensors, fluid level sensors (including a fuel level sensor), brake pad wear sensors, V2V communication unit (which may be integrated into the wireless communications device 30, as discussed below), rain or precipitation sensors (e.g., infrared light sensor(s) directed toward the windshield (or other window of the vehicle 12) to detect rain or other precipitation based on the amount of reflected light), and interior or exterior temperature sensors.

Wireless communications device 30 is capable of communicating data via short-range wireless communications (SRWC) and/or via cellular network communications through use of a cellular chipset 34, as depicted in the illustrated embodiment. In one embodiment, the wireless communications device 30 is a central vehicle computer that is used to carry out at least part of the method discussed below. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), BCM 24, display 50, an infotainment module, a head unit, and/or a gateway module. In one embodiment, the wireless communications device 30 can be a part of an in-vehicle entertainment system that can be controlled through one or more vehicle-user interfaces, such as via touch-screen display 50, button 52, and/or microphone 54. In some embodiments, the device 30 can be implemented as an OEM-installed (embedded) or aftermarket device that is installed in the vehicle. In one embodiment, the wireless communications device 30 is a telematics unit (or telematics control unit) that is capable of carrying out cellular communications using one or more cellular carrier systems 70.

Or, in other embodiments, a separate telematics unit can be included in the vehicle and communicatively coupled to the wireless communications device 30. In some embodiments, the wireless communications device 30 (or telematics unit) can be incorporated with or at least connected to a navigation system that includes geographical map information including geographical roadway map data. The navigation system can be communicatively coupled to the GNSS receiver 22 (either directly or via communications bus 40) and can include an on-board geographical map database that stores local geographical map information.

In some embodiments, the wireless communications device 30 can be configured to communicate wirelessly according to one or more short-range wireless communications (SRWC) such as any of the Wi-Fi™, WiMAX™, Wi-Fi Direct™, IEEE 802.11p, other vehicle to vehicle (V2V) communication protocols, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit 32 may allow the device 30 to connect to another SRWC device, such as the handheld wireless device (HWD) 90 or other vehicles. Additionally, in some embodiments, the wireless communications device may contain a cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

Wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, GPU (General Processing Unit), Accelerators, FPGA (Field Programmable Gated Arrays), other processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may be a non-transitory computer-readable medium or other type of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), and magnetic or optical disc drives.

The wireless communications device 30 can interface various VSMs of the vehicle 12 with one or more devices external to the vehicle 12, such as one or more networks or systems at remote facility 80. This enables various vehicle operations to be carried out and/or monitored by "extra-vehicle" devices (or non-vehicle devices), including the vehicle backend services facility 80 and the HWD 90. For example, the wireless communications device 30 can receive vehicle sensor data from one or more onboard vehicle sensors, and based on this information, an occurrence of a trigger event can be detected. Thereafter, the vehicle can send a notification to the HWD (or other notification device as specified in the notification settings associated with the trigger event), which can include the sensor data (or other data derived from or based on this data).

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information (e.g., monitoring information) and that can obtain vehicle sensor data for use in various embodiments of the method(s) below. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to the particular embodiment shown here, audio system 56 is operatively coupled to both vehicle bus 40 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art.

Visual display or touch-screen 50 is preferably a graphics display and can be used to provide a multitude of input and output functions. Display 50 can be a touch-screen on the instrument panel that is capable of graphically presenting a menu (or graphical menu) and capable of receiving input (or other feedback) from a vehicle user. In other embodiments, the display 50 can be a heads-up display reflected off of the windshield or a projector that can project graphics for viewing by a vehicle occupant. The display 50 can be included as a part of a center console of the vehicle, such as a center console entertainment system of the vehicle. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12 and/or HWD 90). Carrier system 70 can implement any suitable communications technology, including GSM/GORSE technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown in FIG. 1) can be used for one or more purposes, such as for providing connectivity between the vehicle 12 and a notification device, such as the HWD. The computers 78 can be some of a number of computers accessible via a private or public network such as the Internet. A computer 78 can also be used for providing Internet connectivity such as DNS services or as a network address server that uses DHCP or other suitable protocol to assign an IP address to vehicle 12. In one embodiment, the computers 78 are not a part of a vehicle backend services system. Alternatively or additionally, the computers 78 can be message servers, such as email servers or servers used for supporting applications on the HWD 90 of the vehicle.

Vehicle backend services facility 80 is a remote facility, meaning that it is located at a physical location that is located remotely from vehicle 12. The vehicle backend services facility 80 (or "remote facility 80" for short) may be designed to provide the vehicle electronics 20 with a number of different system back-end functions through use of one or more electronic servers, including a vehicle diagnostics application (such as the one discussed above). In one embodiment, the remote facility 80 can include one or more switches, one or more live advisors, and/or an automated voice response system (VRS), all of which are known in the art. Vehicle backend services facility 80 may include any or all of these various components and each of the various components can be coupled to one another via a wired or wireless local area network. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Figure 2:
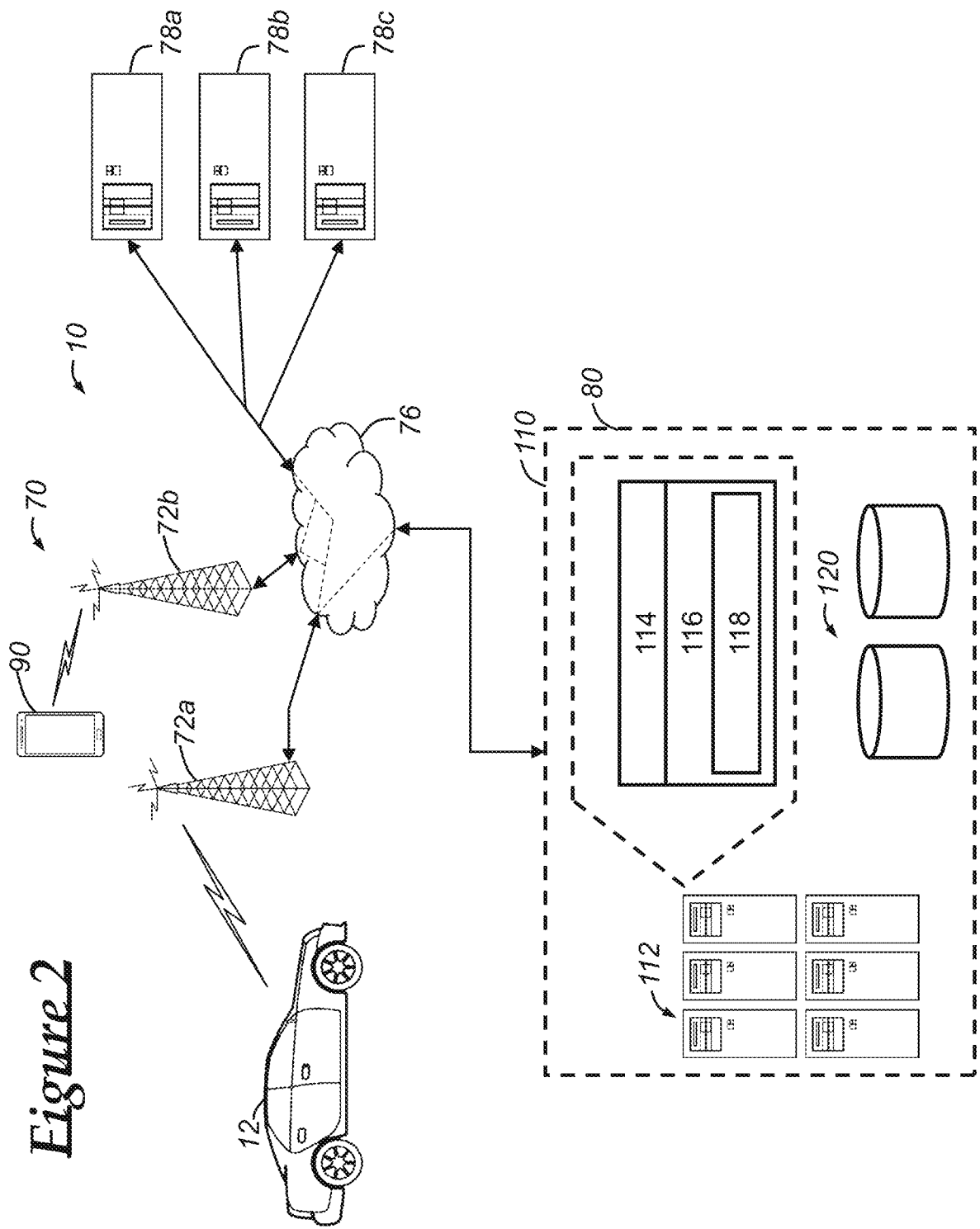
FIG. 2 is a block diagram depicting a detailed portion of the communications system of FIG. 1.

With reference to FIG. 2, there is shown a detailed portion of the communications system 10, including a remote vehicle backend server system 110. In many embodiments, the vehicle backend servers 110 can communicate with the vehicle 12 and store information for the vehicle 12, such as diagnostic information. The vehicle backend services facility 80 includes vehicle backend services servers 112 and databases 120, which may be stored on a plurality of memory devices.

Servers 112 can be computers or other computing devices that include at least one processor and memory. Although six servers are shown, any number of servers can be used. The processors 114 can be any type of device capable of processing electronic instructions including microprocessors, microcontrollers, host processors, controllers, vehicle communication processors, and application specific integrated circuits (ASICs). The processors can be dedicated processors used only for servers 112 or can be shared with other systems. The at least one processor 114 can execute various types of digitally-stored instructions, such as software or firmware, which enable the servers 112 to provide a wide variety of services. In one embodiment, a backend vehicle services application 118 can be executed by the processor 114. This application 118 can be stored on memory 116, as shown. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 112 to connect with one another, databases 120, or other networking devices, including routers, modems, and/or switches. In one particular embodiment, the NICs (including WNICs) of servers 112 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70. The memory 116 can be RAM, ROM, or any other suitable type of memory, such as those discussed below with respect to databases 120.

Databases 120 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. Although two databases are shown, any number of databases can be used. One or more databases at the backend facility 80 can store various information and can include a vehicle sensor information database and other vehicle backend information database(s).

Remote facility 80 can use the information stored in databases 120 to carry out one or more embodiments of the method(s) discussed herein, as well as a vehicle sensor configuration process and various other vehicle backend services functionality. As mentioned above, although only a single vehicle backend services facility 80 is illustrated, numerous vehicle backend services facilities can be used and, in such a case, the functionality of the numerous vehicle backend services facilities can be coordinated so that the vehicle backend services facilities can act as a single backend network or so that the operation of each facility is coordinated with the operation of the other facilities. And, the servers 112 can be used to provide information stored in the databases 120 to various other systems or devices, such as vehicle 12.

Databases 120 can be used to provide information to the servers 112, such as for use in the respective application 118. In one embodiment, databases 120 can each include or be coupled to dedicated database servers that can implement a database abstraction layer (DBAL) and/or a database management system (DBMS) interface, and that operate to provide information from the databases; in other embodiments, the DBAL or DBMS interface can be implemented on servers 112 using processor 114 (or another processor). In the case that the databases 120 are carried out on a dedicated database server(s), the dedicated database server(s) can include their own processor, which can include any one or more of those that are discussed with respect to processors 114. Moreover, the dedicated database server(s) can include memory, such as any one or more of those that are discussed with respect to memory 116.

In particular, the server system 110 can be a vehicle backend services server system 110 (or "vehicle backend system 110" for short). The vehicle backend system 110 can include a backend vehicle services application 118 that can be stored on memory 116 and executed by processor 114. In addition, the backend vehicle services application 118 can be used to obtain and store various vehicle information that is desirable for collection by an OEM, for example. The backend vehicle services application 118 can also be used to provide backend vehicle services, such as those used for navigation.

Databases 120 can include a vehicle electronics reference information database 122 that can store vehicle electronics reference information and a vehicle sensor information database 124 that can store vehicle sensor information (e.g., vehicle sensor data) that is received from one or more vehicles, such as vehicle 12. The vehicle electronics reference information is information that can be used to determine certain trigger events that a particular vehicle is capable of monitoring for. The vehicle electronics reference information can be based on the electronics architecture (e.g., VSM communication architecture, serial data communication architecture) of the vehicle. Thus, in one embodiment, the vehicle electronics reference information can include information concerning various vehicle system modules (VSMs) and electronic communication architectures of various vehicles, and which can be organized according to or based on a particular vehicle electronics configuration type. Moreover, the vehicle electronics reference information can be associated with a corresponding vehicle electronics configuration type and, also, this association can be stored in the vehicle electronics reference information database and/or the vehicle sensor information database.

Additionally, the databases 120 can include information indicating possible notification preferences or settings that can be used as a part of a user-defined notification task. In some embodiments, this information can be based on the vehicle electronics reference information. Moreover, the databases 120 can include subscriber or vehicle user information, which can include HWDs or other devices associated with a particular vehicle or vehicle user.

The handheld wireless device (HWD) 90 is a SRWC device (i.e., a device capable of SRWC) and may include: hardware, software, and/or firmware enabling cellular telecommunications and SRWC as well as other mobile device applications, such as a vehicle management application 92. The hardware of the HWD 90 may comprise: a processor and memory for storing the software, firmware, etc. The HWD processor and memory may enable various software applications, which may be preinstalled or installed by the user (or manufacturer) (e.g., having a software application or graphical user interface (GUI)). One implementation of the application 92 enables a vehicle user to communicate with the vehicle 12 and/or control various aspects or functions of the vehicle, some of which are listed above. Additionally, one or more applications may allow the user to connect with the remote facility 80 or call center advisors at any time. The application 92 can also provide a user an interface for controlling various vehicle functionality.

The handheld wireless device 90 can be directly connected to the vehicle 12 so that the vehicle 12 can send notifications to the HWD 90 without having to utilize a backend vehicle services facility, such as backend vehicle services facility 80. As illustrated in FIG. 2, the HWD 90 can be connected to the vehicle 12 directly using the cellular carrier system 70 (see dashed lines between the cell tower 72a and the cell tower 72). Additionally, or alternatively, the HWD 90 can be connected to the vehicle 12 via one or more backend message server(s) 78a-c, which are servers that are not a part of the vehicle backend system and are different from the backend vehicle services facility 80. For example, the backend message server(s) 78a-c can be an email server or an application server that is used to support the HWD application 92.

With reference to FIG. 3, there is shown an embodiment of a method 300 of executing a user-defined notification task. In one embodiment, the method 300 can be carried out by the vehicle electronics, such as by the wireless communications device 30, the BCM 24, and/or another VSM of the vehicle 12. Although the steps of the method 300 are described as being carried out in a particular order, it is hereby contemplated that the steps of the method 300 can be carried out in any technically feasible order as will be appreciated by those skilled in the art.

Prior to the method 300, the vehicle electronics 20 can store a plurality of predefined trigger events and notification settings. Each predefined trigger event can specify one or more conditions that are monitored for by the vehicle. For example, a predefined trigger event can correspond to a vehicle ignition state, such as a vehicle ignition ON or OFF state, or may correspond to a battery state of charge (SoC) being below a particular battery SoC threshold.

The method 300 begins with step 310, wherein vehicle user input is received that specifies a trigger event. In many embodiments, the specified trigger event can be one or more of the predefined trigger events that are selected by the vehicle user. In some instances, the trigger event can be specified by a trigger event type, which can be selected from one or more predefined trigger event types, and by trigger parameter(s). The trigger event types can include, for example, a location trigger, an ignition state trigger, a diagnostic trigger, and an emergency trigger. The trigger event parameters can be certain information that is used as a part of determining whether the trigger event has occurred (see step 340). In one example, a vehicle user can select a location trigger event type (or location trigger) and, then, the vehicle user can specify a particular location (e.g., an address, boundaries, geographical coordinates) or other trigger event parameter(s) that are to be used for monitoring occurrences of the trigger event.

In many embodiments, the vehicle user can use one or more vehicle-user interfaces to select the trigger event type and/or specify trigger event parameters. For example, a menu can be displayed on display 50 of vehicle electronics 20, which can include a plurality of selectable menu options that allow the vehicle user to select a trigger event type. Once selected, the display can enable the vehicle user to input trigger event parameters, such as through using an on-screen keyboard presented on display 50. In other embodiments, the trigger event can be configured using the microphone 54 in conjunction with a natural language understanding (NLU) engine so that user speech can be received and processed. In another embodiment, the trigger event can be configured or input using application 92 on the HWD 90—in such embodiments, the trigger event (and/or the user-defined notification task) can be sent to the vehicle 12 via a SRWC connection or via the remote facility 80, for example.

As mentioned above, exemplary trigger event types include for example, a location trigger, an ignition state trigger, a diagnostic trigger, and an emergency trigger. The ignition state trigger can be used to monitor for a particular ignition state (or primary mover state) of the vehicle. The diagnostic trigger can be used to monitor for particular diagnostic information (e.g., diagnostic trouble codes (DTCs)) that is present at the vehicle. The emergency trigger can be used to monitor an emergency event, such as a collision of the vehicle. In at least one embodiment, each of these various trigger types can be specified by a user along with trigger event parameters. In the case of the location trigger, a location can be provided, which can be a region or a particular location. In the case of the ignition state trigger, a particular ignition state can be specified. In the case of the diagnostic trigger, one or more diagnostic trouble codes (DTCs) or other diagnostic-related information can be specified. And, in the case of the emergency trigger, a type or severity of collision can be specified or selected from a list. The method 300 proceeds to step 320.

In step 320, notification settings are received at the vehicle. In many embodiments, the notification settings can be input by the vehicle user using one or more vehicle-user interfaces, such as the display 50 or the microphone 54. In some embodiments, the notification settings can be configured or input using application 92 on the HWD 90—in such embodiments, the notification settings (and/or the user-defined notification task) can be sent to the vehicle 12 via a SRWC connection or via the remote facility 80, for example. The notification settings can include a notification device (or address), a notification time (including, in some instances, a notification frequency), a notification type (e.g., Short Message Service (SMS), email, HWD application notification), and a notification message body. For example, the vehicle user can select a notification type from a menu presented on the touch-screen display 50. Upon selecting a notification type, the menu presented on the touch-screen display 50 can query the vehicle user to specify either a notification device or a notification address. For example, in the case the vehicle user specifies "SMS" as the notification type, the vehicle can query the vehicle user to provide a telephone number (or to otherwise identify a particular device, which can then be used to determine a telephone number or electronic address). Or, in the case the vehicle use specifies "email" as the notification type, the vehicle can query the user to provide an email address. The method then continues to step 330.

In step 330, one or more vehicle system modules (VSMs) are configured to monitor for an occurrence of the trigger condition of the user-defined notification event. In many embodiments, this configuring step can be carried out in response to receiving the user-defined notification task at the vehicle. In one embodiment, the vehicle 12 can include a single VSM that is configurable to carry out monitoring for various user-defined notification events. For example, a central onboard computer that monitors for information indicating an occurrence of the trigger condition over one or more vehicle communications busses, such as bus 40. This central onboard computer, which can be the wireless communications device 30 (for example), can receive an indication of the user-defined notification event and, in particular, the trigger conditions including the trigger event type and the trigger event parameters. The central onboard computer can store this information in memory, such as memory 38 of the wireless communications device 30. Thus, in one embodiment, the configuring can include storing the user-defined notification event in memory of a VSM that is used for carrying out the monitoring (step 340).

In other embodiments, a VSM can be identified to be configured (and/or monitor for the trigger event) based on the trigger event type of the user-defined notification event. For example, in the case of an ignition event type, the BCM 24 can be configured to monitor for the trigger event since the BCM 24 has access to and/or is regularly provided with ignition event information from an ignition control unit. Thus, in this sense, as a part of the configuring step, the vehicle 12 can identify a VSM of the vehicle electronics 20 based on the trigger event type and, then, that identified VSM can be configured to monitor for an occurrence (or occurrences) of the trigger condition. As another example, the GNSS receiver 22 (or telematics unit that is coupled to the GNSS receiver 22) can be identified for monitoring of location triggers.

As mentioned above, the configuring of a VSM to monitor for an occurrence of the trigger event can include storing the trigger event into memory of the VSM or the vehicle electronics. However, in other embodiments, the configuring can include processing the trigger event, including the trigger event type and/or the trigger event parameters, to develop computer instructions that can be executed by the VSM and used to carry out the monitoring. For example, the vehicle can include predefined computer instructions (or code snippets) for each of the different trigger event types. Then, upon receiving the trigger event parameters, the predefined computer instructions can be modified and compiled at the vehicle to obtain trigger monitoring code that can be executed on a VSM of the vehicle and used to monitor for the occurrence of the trigger event. Other embodiments for configuring VSM(s) to monitor for the trigger event can be used as well. The method 300 continues to step 340.

In step 340, the vehicle monitors for an occurrence of the trigger event using one or more VSMs. In one example, a location trigger can be used for monitoring whether the vehicle is present at a particular location. Another example is using the location trigger for monitoring whether the vehicle is located within a geographical area or whether the vehicle is located outside a geographical area (e.g., the vehicle leaves a geo-fence). In such an example, the central onboard computer can listen for location information (e.g., geographical coordinates from the GNSS) over the communications bus 40; or, in other embodiments, the central onboard computer can identify a VSM that includes such location information and, in response, can query that identified VSM for the location information. Once the location information is received, the central onboard computer can compare the location information (or the "present location information") to the particular location included as a part of the trigger event. In one embodiment, the vehicle can include predefined computer instructions for each trigger event type, as mentioned above. Thus, in some instances, the monitoring can include executing these computer instructions with the trigger event parameters. These trigger event parameters can be recalled for memory and used by the computer instructions to detect an occurrence of the trigger event, or the trigger event parameters can be incorporated into the predefined computer instructions. When a VSM detects an occurrence of the trigger event, the VSM can inform one or more other VSMs, such as the wireless communications device 30 or a central onboard computer. Once an occurrence of the trigger event, the method 300 continues to step 350.

In step 350, the notification action is executed so that a vehicle user is notified of the occurrence of the trigger event. In some embodiments, this step can be carried out at the time of (an in response to) detecting the occurrence of the trigger event of the user-defined notification task. In one embodiment, the execution of the notification action can include sending a message to the vehicle user according to the notification settings. As an example, when the wireless communications device 30 receives an indication that an occurrence of the trigger event is detected, the wireless communications device 30 can recall notification settings from memory 38 that are associated with the detected trigger event. The wireless communications device 30 can then inspect the notification settings and generate a notification message body, which can contain the substance of the message to be communicated to the vehicle user. As mentioned above, the notification message body can be predefined based on the trigger event type and/or can be customizable by the vehicle user. In some embodiments, the notification message body (or notification message) includes fields that are populated in response to detecting the occurrence of the trigger event (or otherwise at the time of executing the notification action). For example, a first field can be a time field that specifies a time value (e.g., timestamp) corresponding to when the occurrence of the trigger event was detected. As another example, a second field can be a vehicle operator field that specifies an identity of the vehicle operator at the time the occurrence of the trigger event was detected. And, as another example, a third field can be a sensor value obtained that pertains to the trigger event.

In addition to generating or otherwise obtaining the notification message body, the vehicle can determine a communication mechanism for delivery of the notification message. For example, the wireless communications device 30 (or other VSM) can recall the notification type and/or the notification device (or address) from memory 38 (or other memory of the vehicle electronics 20). The notification type (e.g., SMS, email) can then be used to format the message into a suitable format for delivery. And, the notification device (or address) can be used to address the notification message. The notification message can then be sent by the vehicle electronics.

In one embodiment, the notification message can be directly delivered to the notification device (or address) without being first sent to a backend vehicle facility, such as the vehicle backend services facility 80. For example, when the notification message is an SMS message, the vehicle 12 can send the notification message to a first cell tower 72*a*, which can then direct the notification message to a second cell tower 72*b* that is connected to the notification device (FIG. 2). In this example, the HWD 90 is notification device and is connected to the cell tower 72*b*. The notification message is thus delivered to the notification device (e.g., HWD 90) without having to be sent and/or processed by a backend vehicle facility, such as the vehicle backend services facility 80. In another example, the notification message can be an email message that can be delivered to an email server directly without having to be sent and/or processed by a backend vehicle facility. For example, the notification message can be sent from the vehicle 12 through the cellular carrier system 70 and to the remote computers 78*a-c*, which can be email servers for the email addressed specified in the notification settings. The method 300 then ends.

With reference to FIG. 4, there is shown an embodiment of a method 400 of executing a user-defined notification task. In one embodiment, the method 400 can be carried out by the vehicle electronics, such as by the wireless communications device 30, the BCM 24, and/or another VSM of the vehicle 12. Although the steps of the method 400 are described as being carried out in a particular order, it is hereby contemplated that the steps of the method 300 can be carried out in any technically feasible order as will be appreciated by those skilled in the art.

Prior to the method 400, the vehicle electronics 20 can store a plurality of predefined vehicle logging tasks and notification settings. Each predefined vehicle logging task can specify a type of information regarding the vehicle's operation to be collected and recorded. The method 400 begins with step 410, wherein logging task settings are received at the vehicle. The logging task settings can include an information type (or fields), an information recordation frequency, and/or information recordation trigger condition. The information type can specify a type of information to be collected and/or recorded. The information recordation frequency can specify a frequency that the information is to be collected and/or recorded. For example, the vehicle user may define a user-defined notification task that specifies to collect vehicle battery state of charge (SoC) information (i.e., information type) every 1 hour (i.e., information recordation frequency). The information recordation trigger condition can be one or more conditions that must be satisfied before recording the information. In other embodiments, when the vehicle detects that the information recordation trigger condition is satisfied, the vehicle can then record the information at that time—this can be used instead of the information recordation frequency in some embodiments. The method 400 proceeds to step 420.

In step 420, notification settings are received at the vehicle. In many embodiments, the notification settings can be input by the vehicle user using one or more vehicle-user interfaces, such as the display 50 or the microphone 54. This step is similar to step 320 of the method 300 (FIG. 3) discussed above and that discussion is incorporated herein. The method 400 continues to step 430.

In step 430, one or more vehicle system modules (VSMs) are configured to carry out the logging task of the user-defined notification event. In many embodiments, this configuring step can be carried out in response to receiving the user-defined notification task at the vehicle (e.g., steps 410 and 420). This step is similar to step 330 of the method 300 (FIG. 3) discussed above and that discussion is incorporated herein. However, instead of configuring the one or more VSMs to listen or monitor for an occurrence of a trigger event, the one or more VSMs can be configured to carry out or execute the vehicle logging task as defined in the user-defined notification event. For example, this can include storing the logging task settings in memory of a particular VSM, and/or can include generating a logging task code that can be executed by one or more VSMs. For example, the vehicle can include predefined computer instructions (or code snippets) for different information types that can be specified in a user-defined notification task. Then, upon receiving the logging task parameters, the predefined computer instructions can be modified and compiled at the vehicle to obtain information logging code that can be executed on a VSM of the vehicle and used to log, record, and/or collect the specified information. In one embodiment, the information logging code can be developed by a first VSM and then sent to a second VSM. The method 400 then continues to step 440.

In step 440, the vehicle logging task is carried out. In one embodiment, the information logging code is executed by the configured VSM. For example, the configured VSM can listen for particular information that is provided over the bus 40 and then record this information. In another embodiment, the VSM can inspect vehicle logs that are already created pursuant to regular vehicle operation. In such a case, the VSM can then extract this information, process it according to the logging task parameters, and/or store this information in a separate file that is specific to the user-defined notification task. The method 400 then continues to step 450.

In step 450, the notification action is executed so that a vehicle user is provided the information collected during or as a part of the vehicle logging task. In some embodiments, this step can be carried out according to a reporting frequency that is specified in the notification settings (step 420). For example, a user may define a user-defined notification event to report SoC information concerning a vehicle battery every 1 week to the user's HWD 90 using SMS. Thus, battery SoC information can be collected and sent to the HWD 90 each week. This step is similar to step 350 of the method 300 (FIG. 3) discussed above and that discussion is incorporated herein. The method 400 then ends.

In one embodiment, the method 300, the method 400, and/or parts thereof can be implemented in one or more computer programs (or "applications", or "scripts") embodied in a computer readable medium and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers, such as on multiple computers that are in communication with one another.

The computer program(s) can be embodied on computer readable media (e.g., memory at servers 112, memory 38), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of executing a user-defined notification task, wherein the method is carried out by vehicle electronics of the vehicle, wherein the vehicle includes memory that stores a plurality of predefined trigger events and notification settings, and wherein the method comprises:
   receiving a user-defined notification task at the vehicle via one or more user interfaces, wherein the user-defined notification task specifies a trigger event and a notification action, the trigger event being based on a selected predefined trigger event type that is selectable from the plurality of predefined trigger events via the one or more user interfaces, and the notification action being configurable via selection of one or more notification settings via the plurality of notification settings;
   in response to receiving the user-defined notification task at the vehicle, configuring one or more vehicle system modules (VSMs) to monitor for an occurrence of the trigger condition of the user-defined notification event, wherein the configuring step includes:
   identifying the one or more VSMs to be configured based on the selected predefined trigger event type;
   obtaining predefined computer instructions based on the selected predefined trigger event type;
   modifying the predefined computer instructions and compiling the predefined computer instructions to generate trigger event code that when executed by the identified VSM(s) causes the identified VSM(s) to monitor for an occurrence of the trigger event;
   carrying out the modifying and compiling steps at a first VSM that is separate from the identified VSM(s) and then sending the trigger event code to the identified VSM(s);
   monitoring for an occurrence of the trigger event by executing the trigger event code at the identified VSM(s); and
   in response to detecting the occurrence of the trigger event of the user-defined notification task, executing the notification action so that a vehicle user is notified of the occurrence of the trigger event.

2. The method of claim 1, wherein the one or more user interfaces are one or more vehicle-user interfaces that includes a touch-screen display, and wherein the touch-screen display is installed on the vehicle and is a part of the vehicle electronics.

3. The method of claim 1, wherein the receiving step includes receiving trigger event parameters via the one or more user interfaces.

4. The method of claim 3, wherein the configuring step further includes sending the trigger event parameters to the identified VSM(s).

5. The method of claim 1, wherein the notification action includes generating a notification message according to the selected notification settings and sending the notification message to a device that is not a part of the vehicle electronics or a part of a backend vehicle facility.

6. The method of claim 5, wherein the notification action includes directly sending the notification message to the device without sending the notification message to a backend vehicle facility.

7. A method of executing a user-defined notification task, wherein the method is carried out by vehicle electronics of the vehicle, wherein the vehicle includes memory that stores a plurality of predefined vehicle logging tasks and notification settings, and wherein the method comprises:
   receiving a user-defined notification task at the vehicle via one or more vehicle-user interfaces of the vehicle, wherein the user-defined notification task specifies a vehicle logging task and a notification action, the vehicle logging task being based on a selected predefined vehicle logging task that is selectable from the plurality of predefined vehicle logging tasks via the one or more vehicle-user interfaces, and the notification action being configurable via selection of one or more notification settings via the plurality of notification settings;
   in response to receiving the user-defined notification task at the vehicle, configuring a first vehicle system module (VSM) to carry out the logging task of the user-defined notification event, wherein the configuring step includes:
   obtaining, at a second VSM, predefined computer instructions based on the selected predefined vehicle logging task;
   modifying the predefined computer instructions at the second VSM and compiling the predefined computer instructions to obtain information logging code that is executable at the first VSM;
   configuring the first VSM to carry out the logging task of the user-defined notification event by sending the information logging code to the first VSM;
   carrying out the vehicle logging task of the user-defined notification event at the first VSM by executing the information logging code, wherein the vehicle logging task includes collecting information concerning the operation of the vehicle; and
   in response to detecting an occurrence of a trigger condition of the user-defined notification task, executing the notification action so that a vehicle user is provided the reporting information.

8. The method of claim 7, wherein the trigger condition is a reporting task frequency that is specified as a part of the user-defined notification task.

9. The method of claim 7, wherein each of the plurality of vehicle logging tasks specify a particular type of information to be collected as a part of carrying out the vehicle logging task.

10. The method of claim 7, wherein the collected information of the vehicle is information collected concerning a vehicle operational state.

11. The method of claim 7, wherein the carrying out step includes inspecting a vehicle log that is regularly maintained by the vehicle and extracting information from the vehicle log in accordance with the vehicle logging task.

12. The method of claim 11, wherein the carrying out step further includes storing the extracted information in a separate file for the user-defined notification task.

13. The method of claim 11, wherein the notification action includes generating a notification message according to the selected notification settings and sending the notification message to a device that is not a part of the vehicle electronics or a part of a backend vehicle facility.

14. The method of claim 11, wherein the notification action includes directly sending the notification message to the device without sending the notification message to a backend vehicle facility.

15. The method of claim 7, wherein the carrying out step is performed by the first VSM and the executing step is carried out by the second VSM that is separate from the first VSM.

16. The method of claim 7, wherein the vehicle periodically updates a list of the plurality of predefined vehicle logging tasks, and wherein the list is stored on the memory of the vehicle electronics.

* * * * *